(12) United States Patent
Yao

(10) Patent No.: US 7,265,836 B1
(45) Date of Patent: Sep. 4, 2007

(54) IN-LINE OPTICAL POLARIMETER USING FREE-SPACE POLARIZATION SAMPLING ELEMENTS

(75) Inventor: X. Steve Yao, Diamond Bar, CA (US)

(73) Assignee: General Photonics Corporation, Chino, CA (US)

(*) Notice: Subject to any disclaimer, the term of this patent is extended or adjusted under 35 U.S.C. 154(b) by 204 days.

(21) Appl. No.: 11/025,662

(22) Filed: Dec. 28, 2004

Related U.S. Application Data

(63) Continuation-in-part of application No. 10/101,515, filed on Mar. 18, 2002, now Pat. No. 6,836,327.

(60) Provisional application No. 60/276,801, filed on Mar. 16, 2001.

(51) Int. Cl.
*G01J 4/00* (2006.01)

(52) U.S. Cl. .................................... 356/367

(58) Field of Classification Search .................. None
See application file for complete search history.

(56) References Cited

U.S. PATENT DOCUMENTS

| | | | | |
|---|---|---|---|---|
| 6,043,887 | A * | 3/2000 | Allard et al. | 356/364 |
| 6,175,412 | B1 * | 1/2001 | Drevillon et al. | 356/369 |
| 6,211,957 | B1 | 4/2001 | Erdogan et al. | |
| 6,384,916 | B1 * | 5/2002 | Furtak | 356/369 |
| 6,717,706 | B2 * | 4/2004 | Miller et al. | 359/237 |

OTHER PUBLICATIONS

R. Azzam, *In-line light-saving photopolarimeter and its fiber-optic analog*, 1987, Optical Society of America.
B. Scholl et al., *In-line fiber optic polarimeter with a 99% coupler*, Jun. 1995, Optical Engineering, vol. 34 No. 6.
A. Bouzid et al., *Fiber-optic four-detector polarimeter*, 1995, Optics Communications 118.
P. Westbrook et al., *In-Line Polarimeter Using Blazed Fiber Gratings*, Oct. 2000, IEEE Photonics Technology Letters, vol. 12, No. 10.

* cited by examiner

*Primary Examiner*—Layla G. Lauchman
*Assistant Examiner*—Gordon J. Stack, Jr.
(74) *Attorney, Agent, or Firm*—Fish & Richardson P.C.

(57) ABSTRACT

This application teaches various implementations of methods and in-line polarimeters with free-space sampling elements to sample four sample beams for determining the polarization state of input light. In one exemplary implementation, a device in this application includes four optical polarization analyzers arranged in series to form an optical path in free space to split four sample beams with four different states of polarization from an input optical beam propagating along the optical path. Each optical polarization analyzer transmits a majority of the input optical beam along the optical path and splits a fraction of the input beam as a respective sample beam. The device also includes four optical detectors respectively positioned in optical paths of the four sample beams to convert the sample beams into four detector signals indicative of optical power levels of the four different states of polarization, respectively.

11 Claims, 9 Drawing Sheets

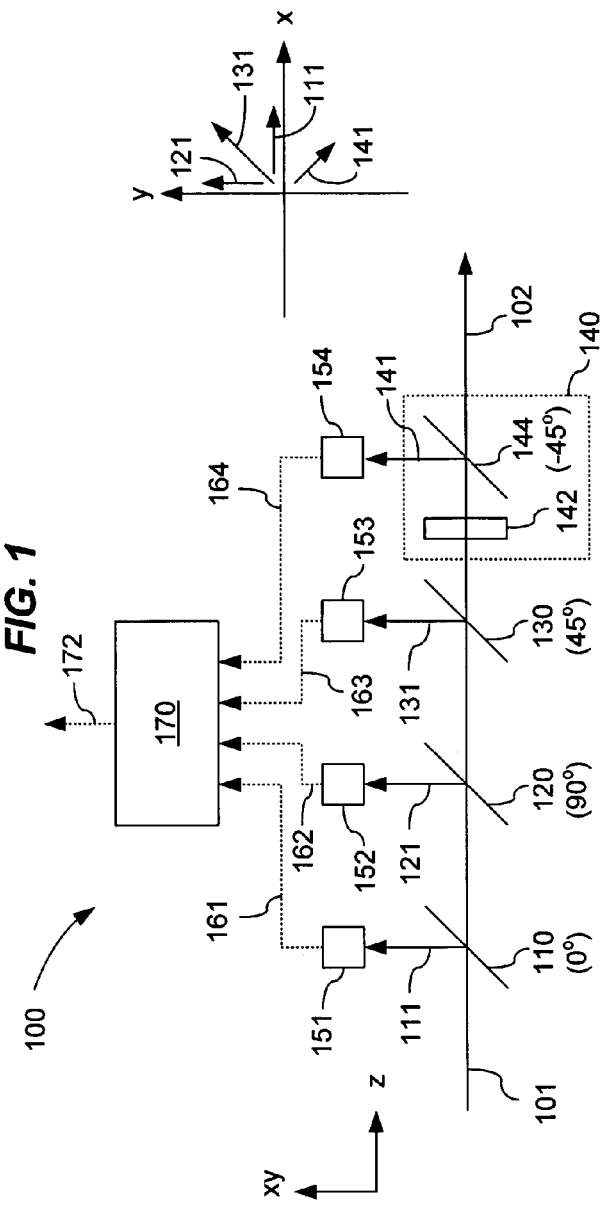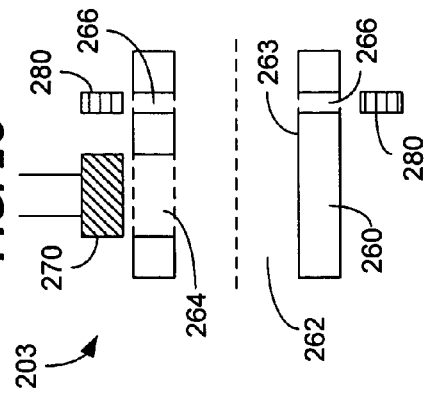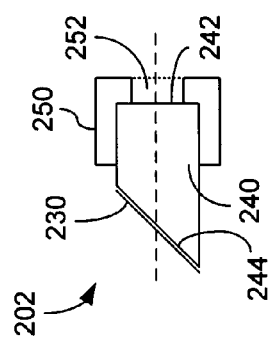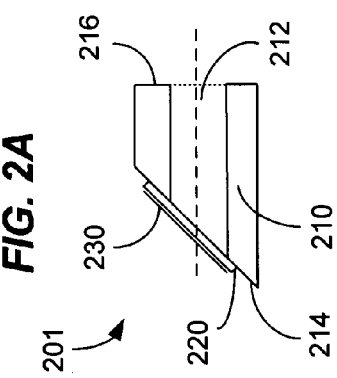

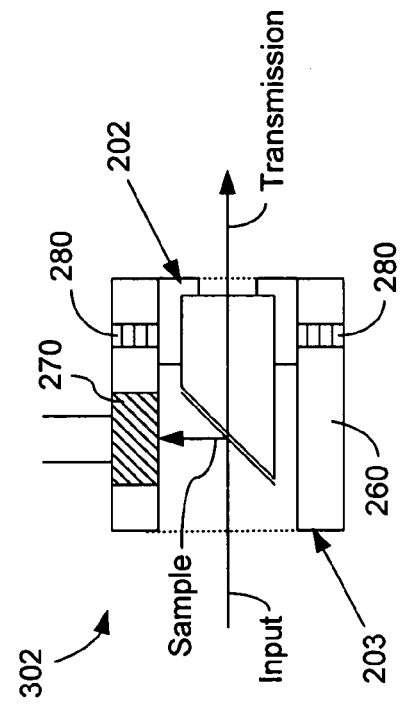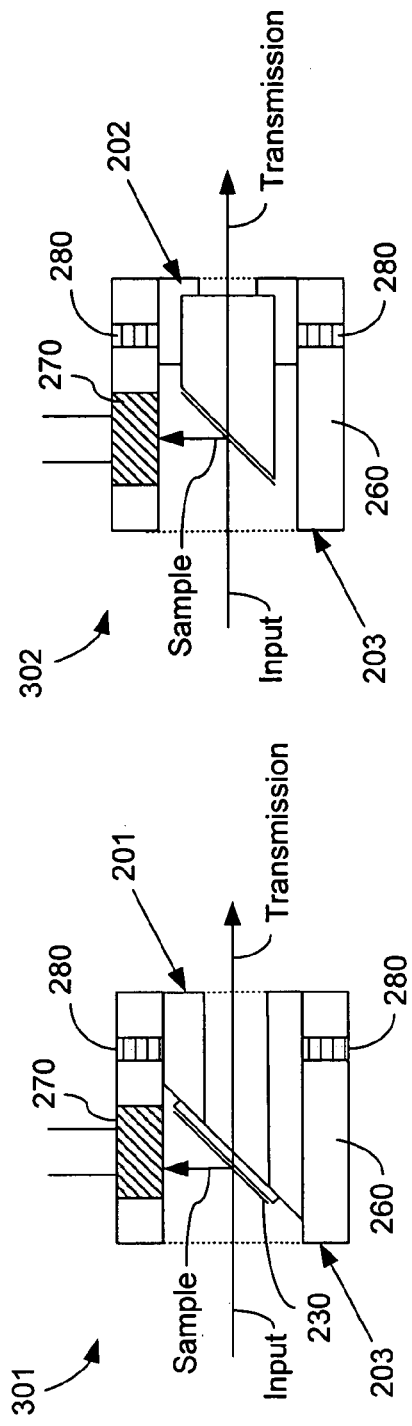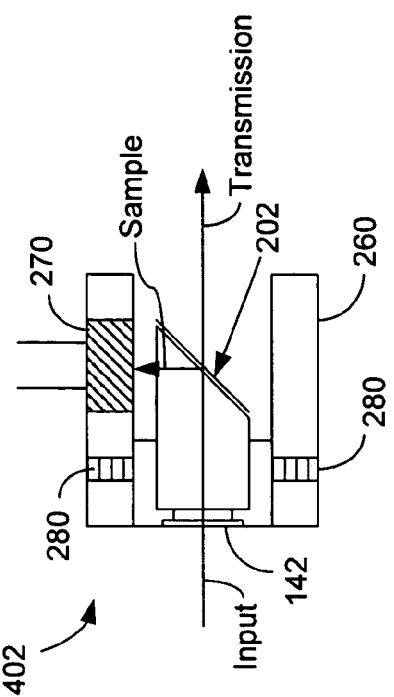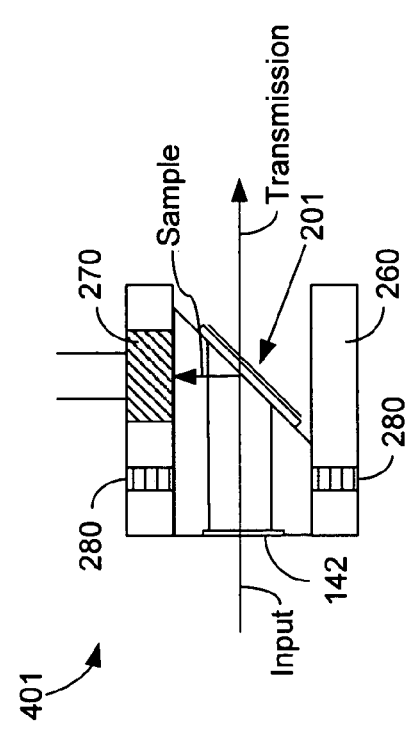

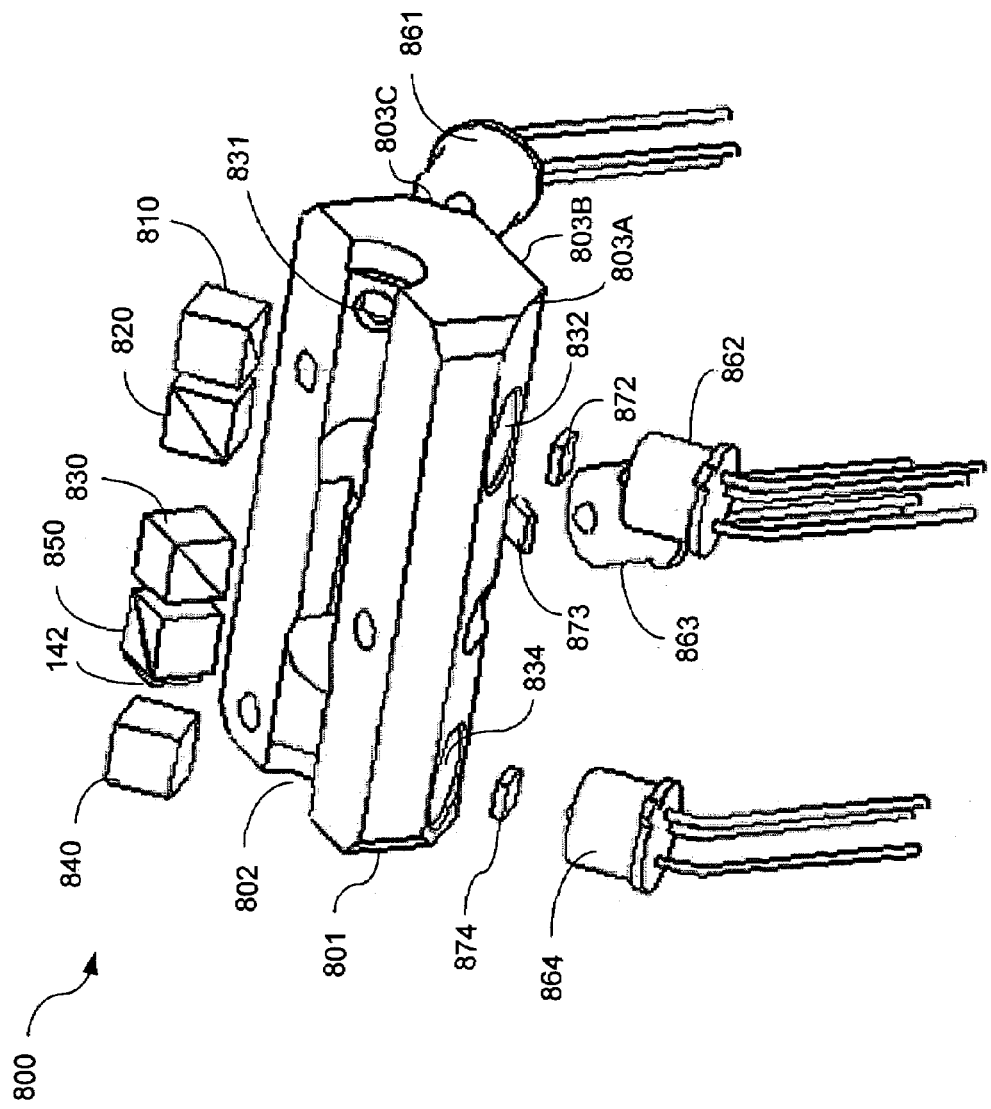

IN-LINE OPTICAL POLARIMETER USING FREE-SPACE POLARIZATION SAMPLING ELEMENTS

This application is a continuation-in-part application of U.S. application Ser. No. 10/101,515 entitled "IN-LINE OPTICAL POLARIMETER BASED ON INTEGRATION OF FREE-SPACE OPTICAL ELEMENTS" and filed Mar. 18, 2002, which issues as U.S. Pat. No. 6,836,327 on Dec. 28, 2004 and claims the benefit of U.S. Provisional Application No. 60/276,801 filed on Mar. 16, 2001. The entire disclosures of the above-referenced two patent applications are incorporated herein by reference as part of the specification of this application.

BACKGROUND

This application relates to measurements of polarization of light.

The state of polarization of light is an important parameter of an optical beam in part because it affects behavior of the optical beam when interacting with an optical medium or an optical element. Various optical devices and systems can be sensitive to the state of polarization of the beam to be processed or transmitted. For example, certain coherent optical processing may require a match between the states of polarization of two separate optical beams when the two beams are superposed. For another example, a birefringent optical element may attenuate an optical signal differently when the polarization of the signal forms different angles with respect to a given principal axis of polarization of the element. An optical amplifier with a saturable gain medium may also produce a polarization-dependent gain when a polarization component with a high intensity saturates the gain medium and hence experiences an optical gain less than that of another, weaker polarization component. Furthermore, certain optical modulators may also produce different modulation depths on optical signals with different polarizations. Semiconductor electro-absorption modulators and electro-optical modulators based on birefringent crystals such as lithium niobate are examples of such modulators.

Hence, it is desirable to control the polarization of an optical signal in those and other polarization-sensitive devices and systems. To achieve such polarization control, it is essential to measure the state of polarization of the signal so that a proper polarization control can be applied in response to the measured polarization. Various polarimeters have developed to measure the state of polarization of light based on analysis of the Stokes polarization vector. Such polarimeters may be designed to split light into four different beams for measuring the Stokes vector components.

In one implementation, for example, a first beam is used to measure the total intensity of the light; second and third beams are sent through polarizers at different relative angles where the transmitted intensities are measured; and a fourth beam is sent through a phase retarder and a polarizer where the transmitted intensity is measured. The measured intensities of the four beams are then used to compute the four Stokes vector components which uniquely determine the state of polarization.

The polarization of an optical signal may not be static but dynamically vary with time in some optical systems due to fluctuations in factors such as light sources, optical components, and optical transmission media. For example, some optical fibers may be birefringent to exhibit different refractive indices for different polarizations. Typical causes for this fiber birefringence include, among others, imperfect circular cores, and unbalanced stress in a fiber along different transverse directions. Fluctuations in local temperature and stress along a fiber line, therefore, can randomly change the axis of birefringence of the optical fiber at different locations. The polarization of light transmitting through such a fiber, therefore, may also fluctuate with time. This can also cause polarization-mode dispersion (PMD) in optical signals with two orthogonal principal polarization states.

Hence, it may also be desirable that the polarimeter operates sufficiently fast so that a polarization control mechanism can change its control in response to any variation in the input polarization of light and therefore maintain the output polarization at a desired state.

SUMMARY

This application describes various implementations of methods and in-line polarimeters with free-space sampling elements to sample four sample beams for determining the polarization state of input light.

In one implementation, for example, a device described in this application includes four optical polarization analyzers arranged in series to form an optical path in free space to split four sample beams with four different states of polarization from an input optical beam propagating along the optical path. Each optical polarization analyzer transmits a majority of the input optical beam along the optical path and splits a fraction of the input beam as a respective sample beam. The device also includes four optical detectors respectively positioned in optical paths of the four sample beams to convert the sample beams into four detector signals indicative of optical power levels of the four different states of polarization, respectively.

In the above device, the first, second and third optical polarization analyzers of the four optical polarization analyzers may be linear polarization analyzers and a fourth optical polarization analyzer of the four optical polarization analyzers may be a circular polarization analyzer which includes a quarter-wave plate and a fourth linear polarization analyzer downstream from the quarter-wave plate in the optical path. A fifth linear polarization analyzer may be positioned in the optical path adjacent to a selected linear polarization analyzer of the four linear polarization analyzers and mounted in the groove of the base. The fifth linear polarization analyzer may be oriented to be orthogonal in polarization to the selected linear polarization analyzer to compensate for a polarization-dependent loss caused by the selected linear polarization analyzer.

In another implementation, a device described in this application includes a base which includes a groove and four through holes located at four different sampling positions along the groove, and three optical linear polarization analyzers mounted in three of the four different sampling positions in the groove to define an optical path in free space to split three sample beams with three different states of linear polarization from an input optical beam propagating along the optical path. Each optical linear polarization analyzer transmits a majority of the input optical beam along the optical path and splits a fraction of the input beam in a predetermined linear polarization as a respective sample beam into a respective through hole in the base. A quarter-wave plate is mounted in the groove before a fourth sampling position along the groove that is not occupied by any of the three optical linear polarization analyzers and a fourth optical linear polarization analyzer is also mounted in the groove at the fourth sampling position to receive light transmitted through the quarter-wave plate along the optical path and to split a fraction of the received light in a fourth linear polarization to produce a fourth sample beam into a fourth through hole in the base. The fourth optical linear polarization analyzer and the quarter-wave plate form a circular polarization analyzer. In addition, this device includes four optical detectors respectively positioned in the four through holes in the base to receive the four sample beams, respectively, and to convert the four sample beams into four detector signals indicative of optical power levels of the four sample beams, respectively.

This application further describes techniques for compensating polarization-dependent loss in in-linear polarimeters. In one implementation, an input optical beam is directed through an optical path in free space to split four sample beams from said input optical beam for measuring an input polarization of the input optical beam and to transmit a majority of the input optical beam as an output beam. Two linear polarization analyzers are placed adjacent to each other in the optical path with orthogonal polarization directions to obtain first and second sample beams of the four sample beams by reflecting fractions of the input beam. A third linear polarization analyzer is placed in the optical path with a third polarization direction different from polarization directions of the first and second linear polarization analyzers to obtain a third sample beam of the four sample beams. A quarter-wave plate and a downstream fourth linear polarization analyzer are placed in combination as a circular polarization analyzer in the optical path to obtain a fourth monitor beam of the four sample beams. Another linear polarization analyzer is placed adjacent to and orthogonal in polarization to at least one of the third and fourth linear polarization analyzers to reduce a polarization-dependent loss caused by the at least one of the third and fourth linear polarization analyzers. Four separate optical detectors are used to convert the four sample beams into four detector signals, respectively. The four detector signals are processed to determine the input polarization state of the input optical beam.

Other implementations are also described.

In one example, an input optical beam is directed through an optical path in free space to split four monitor beams from the input optical beam for measuring an input polarization of the input optical beam and to transmit a majority of the input optical beam as an output beam. three linear polarization analyzers are placed in the optical path with polarization directions at zero degree, 90 degrees, and 45 degrees, respectively, to obtain first, second, and third monitor beams by reflecting fractions of the input beam. A circular polarization analyzer is also placed in the optical path after the three linear polarization analyzers to obtain a fourth monitor beam by reflecting a fraction of the input beam and transmitting the remaining light to produce the output beam. The first, the second, the third, and the fourth monitor beams are converted into first, second, third, and fourth detector signals, respectively. Next, the first, the second, the third, and the fourth detector signals are processed to determine the input polarization state of the input optical beam.

Another example of the in-line polarimeters includes an optical path in free space to transmit an input optical beam, first, second, third and fourth polarization-selective elements in the optical path. The first polarization-selective element includes a first reflective surface at 45 degrees with respect to the optical path to reflect a fraction of the input optical beam in the S polarization to produce a first monitor beam and to transmit the remaining input optical beam along the optical path as a first transmitted beam. The second polarization-selective element includes a reflective surface at 45 degrees with respect to the optical path and rotated from the first reflective surface around the optical path by 45 degrees to reflect a fraction of the first transmitted beam in the S polarization to produce a second monitor beam and to transmit the remaining of the first transmitted beam along the optical path as a second transmitted beam. The third polarization-selective element includes a reflective surface at 45 degrees with respect to the optical path and rotated from the first reflective surface around the optical path by 90 degrees to reflect a fraction of the second transmitted beam in the S polarization to produce a third monitor beam and to transmit the remaining of the second transmitted beam along the optical path as a third transmitted beam. A quarter-wave plate is placed in the optical path to transmit the third transmitted beam as a fourth transmitted beam. The fourth polarization-selective element includes a reflective surface at 45 degrees with respect to the optical path and rotated from the first reflective surface around the optical path by 135 degrees to reflect a fraction of the fourth transmitted beam in the S polarization to produce a fourth monitor beam and to transmit the remaining of the fourth transmitted beam along the optical path as an output transmitted beam.

In addition, the above device includes four optical detectors respectively to receive the first, the second, the third, and the fourth monitor beams to produce first, second, third, and fourth detector signals, respectively. Furthermore, the device includes a processing circuit coupled to receive the first, the second, the third, and the fourth detector signals to determine an input polarization state of the input optical beam.

An example of methods for determining input polarization of light is described to include the following. An input optical beam is directed through an optical path in free space to split four monitor beams from the input optical beam for measuring an input polarization of the input optical beam and to transmit a majority of the input optical beam as an output beam. A fraction of the input optical beam in the S polarization is reflected to produce a first monitor beam along a first direction that is perpendicular to the optical path and to transmit the remaining optical beam along the optical path. A fraction of the input optical beam in the S polarization is reflected to produce a second monitor beam along a second direction that is rotated 90 degrees from the first direction around the optical path and to transmit the remaining optical beam along the optical path. A fraction of the input optical beam in the S polarization is also reflected to produce a third monitor beam along a third direction which is rotated around the optical path by 45 degrees from the first direction and to transmit the remaining optical beam along the optical path. After obtaining the first, the second, and the third monitor beams, the transmitted optical beam is directed to pass through a quarter-wave plate in the optical path. Next, a fraction of an optical beam transmitted through the quarter wave plate in the S polarization is reflected to produce a fourth monitor beam along a fourth direction which is rotated around the optical path by 135 degrees from the first direction and to transmit the remaining optical beam along the optical path as the output beam. The first, the second, the third, and the fourth monitor beams are then converted into first, second, third, and fourth detector signals, respectively. Next, the first, the second, the third, and the fourth detector signals are processed to determine the input polarization state of the input optical beam.

These and other implementations and examples are described in greater detail in the attached drawings, the detailed description, and the claims.

BRIEF DESCRIPTION OF THE DRAWINGS

FIG. 1 shows one embodiment of an in-line polarimeter.

FIGS. 2A, 2B, 2C, 3A, 3B, 4A, and 4B show exemplary implementations of the components in the device in FIG. 1.

FIGS. 8A, 8B, 8C, 8D and 8E show various views of an example of an in-line polarimeter with an alternative design where four polarization-sensitive beam splitting cubes are mounted on an integrated platform.

DETAILED DESCRIPTION

Figure 5A:
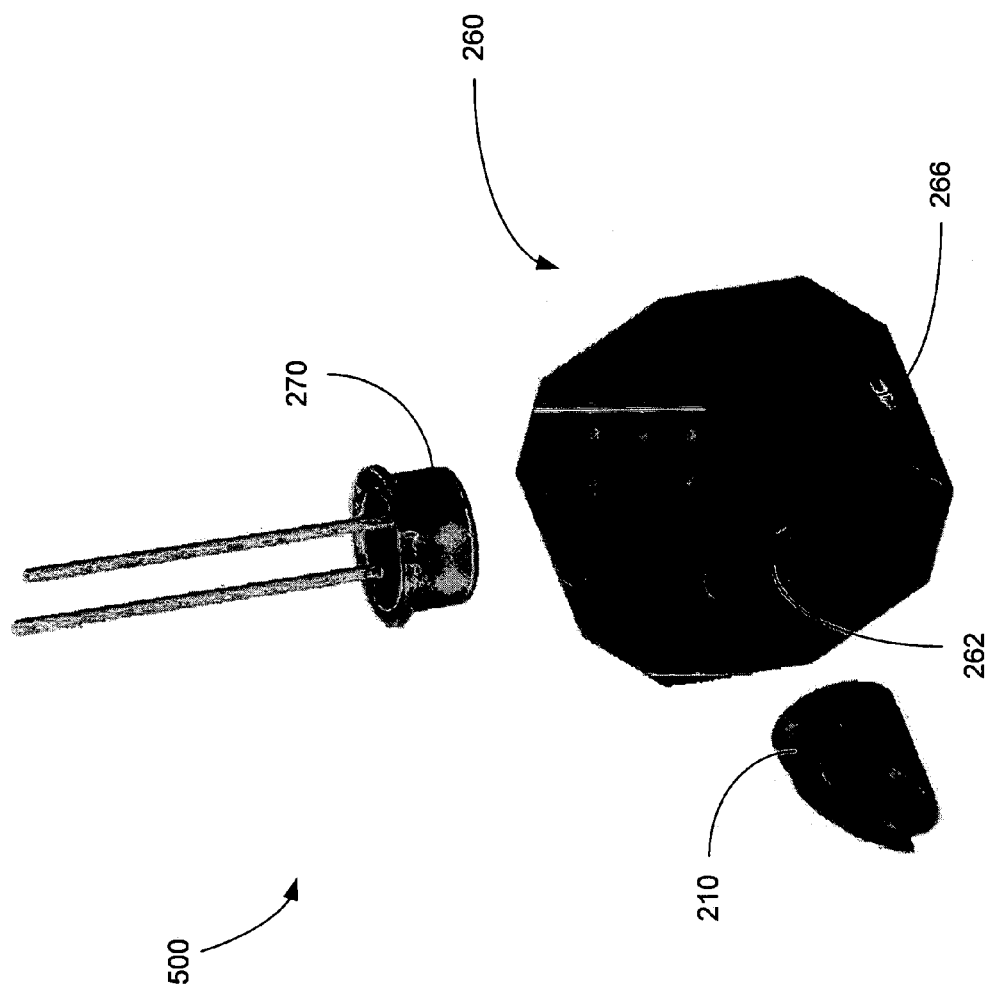
FIG. 5A shows one embodiment of a housing for each component shown in FIGS. 2A, 2B, 2C, 3A, 3B, 4A, and 4B.

This application includes polarimeters in an "in-line" configuration where an input light, after transmitting through the polarimeters, still retains the majority of the input power and information in the input light and hence can be used for further processing or transmission. Unlike some other polarimeters where the input properties of input light, once received and measured, are essentially lost, the polarimeters described herein are essentially "transparent" to the input light by tapping a small fraction of input light form polarization measurements and allowing the majority of input light to transmit through without changing its information content.

FIG. 1 shows one embodiment of an in-line polarimeter 100 where four optical elements 110, 120, 130, and 140 are used to each tap a small fraction of an input beam 101 for polarization measurement. The optical elements 110-140 are aligned to form an optical path along which the input beam 101 is coupled into the polarimeter 100 and emerges as a transmitted output beam 102. Four optical detectors 151, 152, 153, and 154, such as photodiodes, are positioned relative to the optical elements 110-140 to receive tapped optical signals 111, 121, 131, and 141, respectively. The tapped optical signals 111-141 are converted into detector signals 161, 162, 163, and 164, respectively. A processing unit 170, which may be a processing circuit including a digital circuit with a microprocessor, is coupled to the detectors 151-154 to process the signals 161-164 to produce an output 172 that has information on the measured state of polarization of the input beam 101.

FIG. 1 shows a xyz coordinate system to define directions of optical elements 110-140. The z direction represents the direction of the optical path defined and formed by the optical elements 110-140. The optical element 110 has an optical surface oriented at about 45 degrees with respect to the z direction to reflect a small fraction of the input light along z direction as a first tapped beam 111 to the x-direction into the first detector 151. The majority of the input beam transmits through the element 110 along the z direction. Notably, the optical surface of the element 110 is polarization sensitive and is designed to reflect a few percent, e.g., about 1%~4%, of the polarization along the x direction, i.e., the S polarization for the element 110. The remaining light, regardless of states of polarization, is transmitted through the element 110 along the z direction.

The elements 120 and 130 are similar to the element 110 and are also formed with the above polarization-sensitive surface oriented about 45 degrees with respect to the z axis. However, the element 120 has its polarization sensitive surface rotated about 90 degrees with respect to the z direction relative to the reflective surface of the element 110 so that the tapped beam 121 has a polarization along the y direction. The element 130 has its polarization sensitive surface rotated about 45 degrees with respect to the z direction relative to the reflective surface of the element 110 so that the tapped beam 131 has a polarization at +45 degrees with respect to the x direction.

The optical element 140 includes an optical retarder 142 such as a quarter-wave plate and a polarization-sensitive surface 144. Similar to elements 110-130, the surface 144 is oriented about 45 degrees with respect to the z axis to reflect the tapped beam 141 perpendicular to the z axis into the detector 154. Unlike elements 110-130, the polarization sensitive surface 144 is rotated about 45 degrees with respect to the z direction relative to the reflective surface of the element 110 so that the tapped beam 141 has a polarization at 135 degrees (or −45 degrees) with respect to x direction. The insert in FIG. 1 illustrates the states of polarizations of the tapped beams 111, 121, 131, and 141.

Hence, the elements 110, 120, 130, and 144 may use the same design but are assembled together in the polarimeter 100 with different orientations. This design can simplify the fabrication and reduce the cost. FIGS. 2A, 2B, 2C, 3A, and 3B show examples of the design for elements 110, 120, 130, and 144.

FIG. 2A shows an optical assembly 201 as part of each optical elements 110, 120, 130, and 144. A properly-shaped holder 210 is provided to have a first end facet 214 with a 45-degree angle and a second perpendicular end surface 216. A through hole 216 is formed in the center from the facet 214 to the facet 216 to allow transmission of light. An optically transparent plate 220 is engaged to the end facet 214 and is coated with a coating structure 230 to achieve the polarization sensitive reflection. The exterior shape of the holder 210 may be cylindrical.

FIG. 2C shows a housing unit 203 for holding the assembly 201 in a proper orientation and an optical detector 270 for collecting the tapped beam from the surface 230. The housing unit 203 includes a housing 260 configured to have a through hole 262. The interior surface 263 has a shape that conforms with the exterior shape of the holder 210 of the assembly 201 so that the assembly 210 can be fit into the housing unit 203. The dimension of the hole 262 is slightly larger than that of the assembly 201 so that the assembly 201 can slide into and can be rotated within the hole 262. An aperture 264 is formed at a selected position on the housing 260 to hold the photodetector 270. Through holes 266 are also formed in the housing 260 for fixing the position of the assembly 201 by either using set screws 280 or an adhesive material.

FIG. 3A shows an optical element 301 for the elements 110, 120, 130, and 144. The assembly 201 and the housing unit 203 are assembled together. The assembly 201 is positioned to place the polarization sensitive surface 230 at the photodetector 270.

FIG. 2B further shows an optical assembly 202 alternative to the embodiment 201 in FIG. 2A. A transparent block 240 is shaped to have a 45-degree end facet 244 and a perpendicular facet 242. The polarization sensitive surface structure 230 is formed over the end facet 244. This assembly may be directly mounted to the housing unit 201 without a holder. FIG. 2B shows a holder 250 is used to hold the block 240. The holder 250 has an aperture 252. FIG. 3B shows that the assembly 202 and the housing unit 203 are assembled to form an optical element 302 for the elements 110, 120, 130, and 144.

The optical element 140 may be formed by adding the retarder 142 to either the device 301 shown in FIG. 3A or the device 302 shown in FIG. 3B. FIGS. 4A and 4B show two examples. Alternatively, the optical element 140 may use any of the elements 201 in FIGS. 2A and 202 in FIG. 2B by adding the retarder 142 at the output surface of the previous optical element such as 130.

FIG. 5A further shows a detailed implementation 500 of the design 301 in FIG. 3A where the exterior of the housing 260 is a hexagon.

Figure 5B:
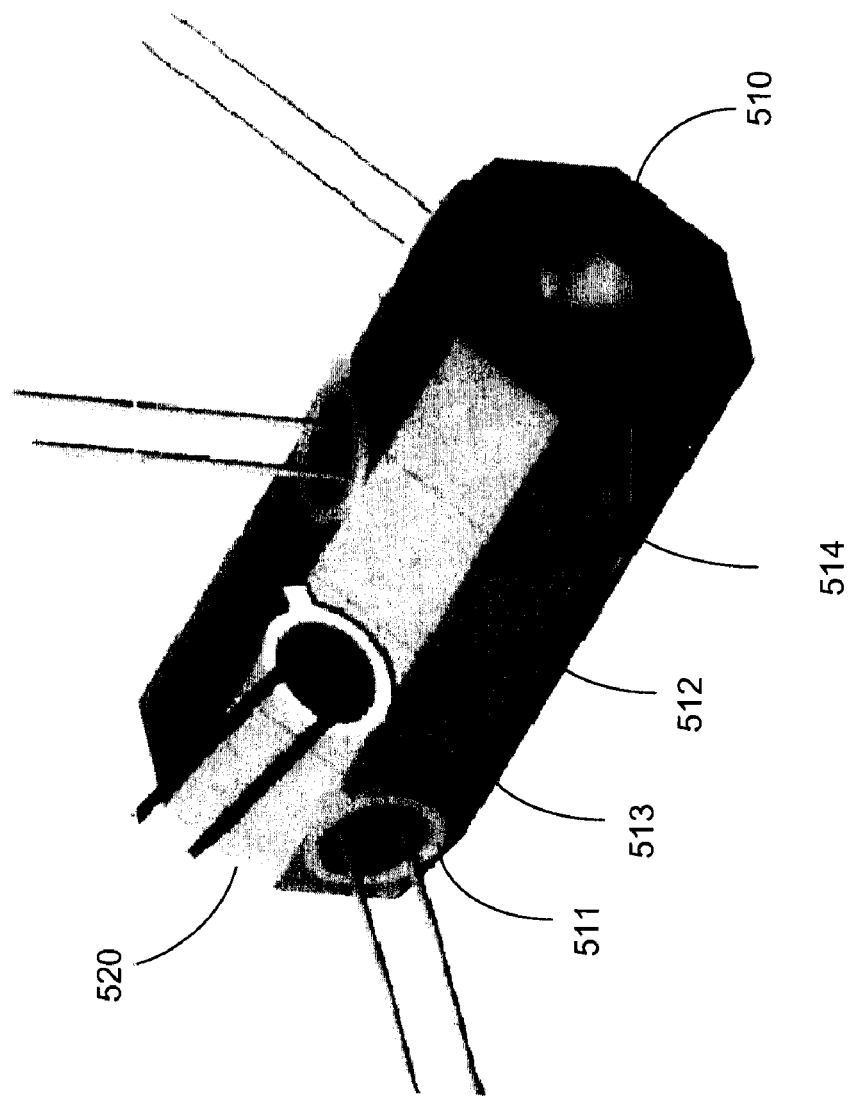
FIG. 5B shows an exemplary in-line polarimeter formed from four components based on the housing design in FIG. 5B.

FIG. 5B shows that 4 elements 511, 512, 513, and 514 are engaged together to form a polarimeter to receive light from the surface 510 and to output light from the surface 520. The elements 511, 512, and 513 is essentially identical in structure shown in FIG. 3A but oriented relative to one another at different angles to operate as the elements 110, 120, and 130 in FIG. 1. The spatial sequence is not critical so the element 130 may be placed at the input to receive the light 101. The element 514 may be implemented based on either the design 401 in FIG. 4A or the design 402 in FIG. 4B and is oriented to have a (−45) degree angle.

It is also contemplated that, an optional polarizer may be placed in the optical path in each of the tapped beams 111, 112, 113, and 114 to ensure that the light received by each detector is in the respective desired polarization. This option may be used when the polarization-sensitive reflective surface 230 in each of the elements 110-140 has error in its reflected polarization.

The output beam 102 is changed in two aspects compared to the input beam 101. First, the polarization of the output beam 102 is rotated by the retarder 142. Secondly, the intensity of the output beam 102 is slightly attenuated due to the optical tapping by the elements 110-140. Other than those, the beam 102 retains all other characteristics of the input beam 101, including information modulated on the beam 101. Since the amount of the rotation in the polarization by the retarder 142 is known, the output beam 102 is equivalent to the input beam 101 for all practical purposes.

It can be shown that the detector signals 161, 162, 163, and 164 are sufficient to conclusively compute the Stokes components and hence the input state of polarization of the light 101. The processing circuit 170 may be designed to carry out such computation and to generate the output 172. A microprocessor may be included in the circuit 170 to perform the computations.

Alternatively, the processing circuit 170 may be designed to store a polarization lookup table that has values of the detector signals 161-164 for all possible states of polarization of the input light. Upon receiving a set of signals from the detectors 151-154, the circuit 170 compares the received signals to the store values in the lookup table to find a match as the output 172. This lookup table may be obtained by using another polarimeter to calibrate the device 100 in FIG. 1 by measuring the polarization and detector signals 161-164 for all possible polarizations.

Figure 6:
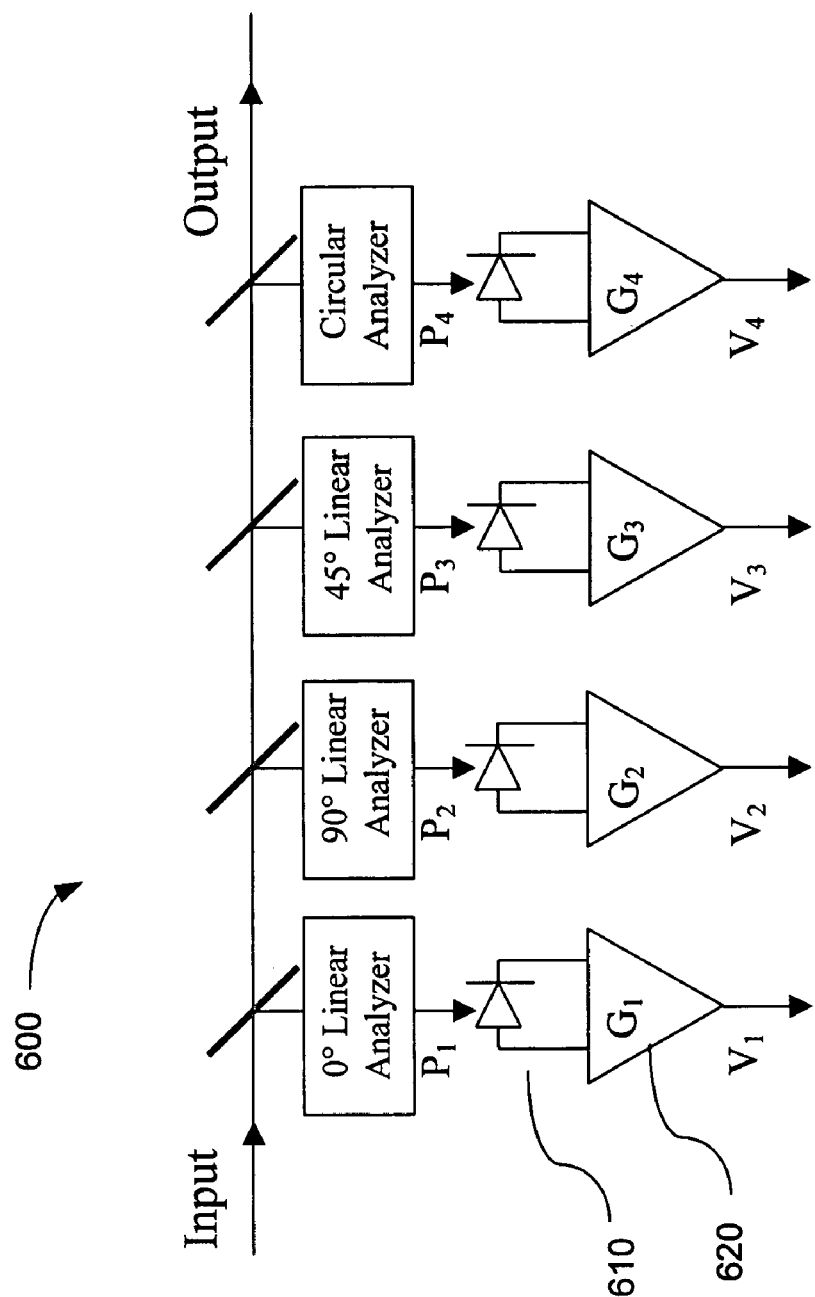
FIGS. 6 and 7 show a calibration system for the in-line polarimeter.

FIG. 6 shows an exemplary in-linear polarimeter 600 based on the above designs, where each optical detector 610 is a photodiode and an amplifier 620 (G1, G2, G3 and G4) is used to amplify the detector output. As describe previously, four partial reflectors and four corresponding polarization analyzers are used. The first, second, and the third are linear analyzers oriented at 0°, 90°, and 45° respectively. The last one is a circular polarization analyzer. The Stokes parameters of the light passing through the device can be calculated using the four optical power values, P1, P2, P3, and P4, measured after each analyzer. Each detection channel should be properly calibrated.

Figure 7:
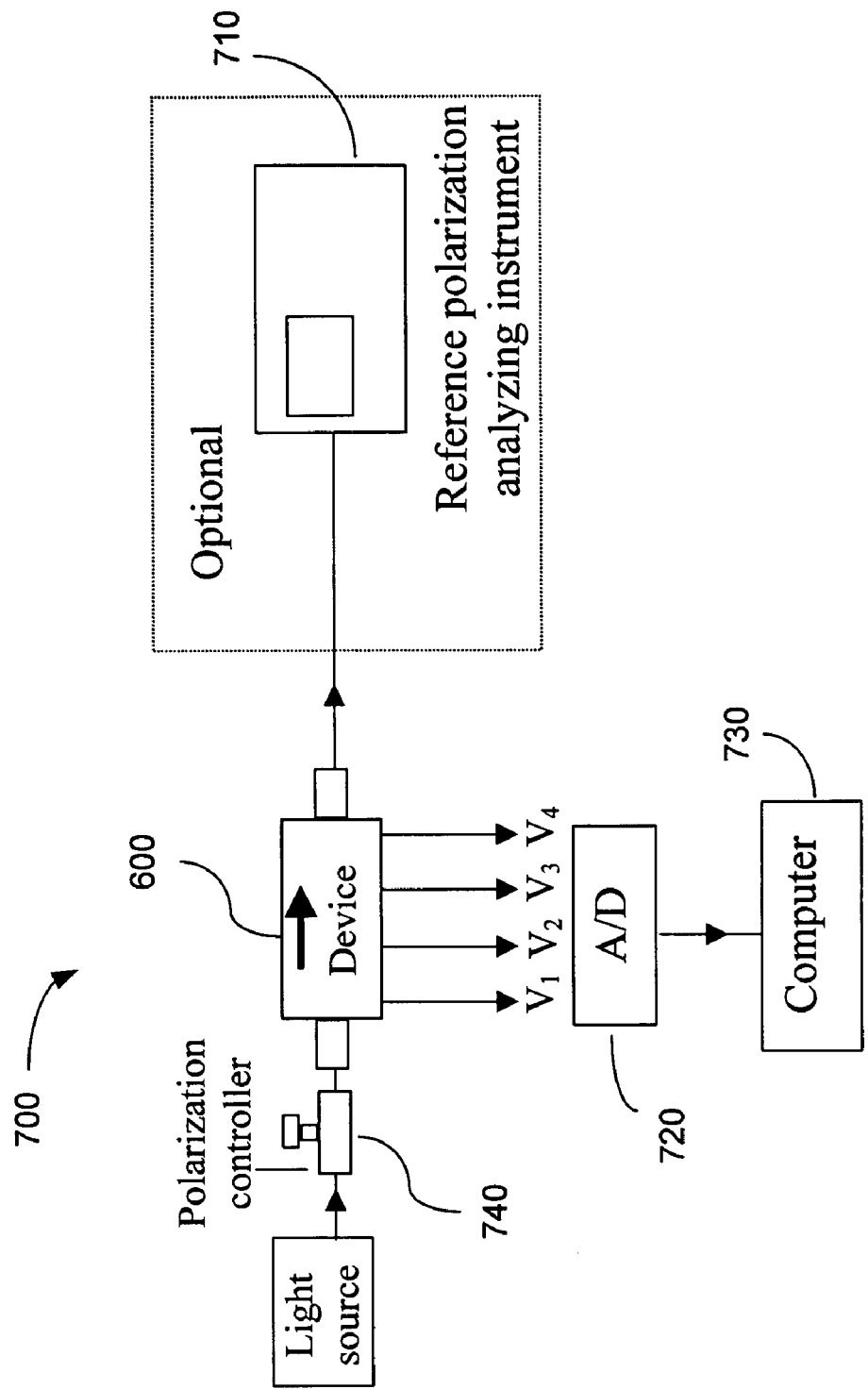

FIG. 7 illustrates a calibration system 700 that calibrates the device 600. An input polarization controller 740 is placed at the input of the device 600 to control the input polarization. An optional reference polarization analyzing instrument 710 may be used to verify the accuracy of the device 600 during the calibration. An analog-to-digital converter card (A/D card) 720 is used to convert the analog output signals from the device 600 into digital signals so that a computer or microprocessor 730 may be used to calculate the state of polarization (SOP) and the degree of polarization (DOP) of the input light using the following formula:

$$\begin{bmatrix} s_1 \\ s_2 \\ s_3 \end{bmatrix} = \begin{bmatrix} (P_1 - P_2)/(P_1 + P_2) \\ [2P_3 - (P_1 + P_2)]/(P_1 + P_2) \\ [2P_4 - (P_1 + P_2)]/(P_1 + P_2) \end{bmatrix}, \quad (1)$$

$$DOP = \sqrt{s_1^2 + s_2^2 + s_3^2}, \quad (2)$$

where $P_1$, $P_2$, $P_3$, and $P_4$ are the optical powers received at the photodetector 1, 2, 3, and 4 respectively.

The optical powers $P_1$, $P_2$, $P_3$, and $P_4$ may be calculated using the four voltages $V_1$, $V_2$, $V_3$, and $V_4$. However, calibration should be performed in order to obtain the correct optical powers at each channel for the following reasons: 1) the photodetectors 610 may have different responsivities; 2) the amplification circuits 620 may have different gains for different photodetectors 610; 3) the reflectivities of the partial reflectors and the transmission coefficients of the polarization analyzers may be different from one another; and 4) the voltages of the amplified signals may have a dependency to the wavelength due to the wavelength sensitivities of the detector, the partial reflectors, and the polarization analyzers.

In general, the relationship between the voltages and the optical powers may be expressed as:

$$V_i(\lambda) = \gamma_i(\lambda) P_i, \quad (3)$$

where $\gamma_i(\lambda)$ is the total response coefficient for channel i and i=1, 2, 3, 4.

To calibrate the device at an arbitrary wavelength $\lambda$, a polarized laser light at $\lambda$ may be input to the device 600. The polarization controller 740 is adjusted so that $V_1$ reaches maximum value $V_{1\,max}^c(\lambda)$. This value is recorded. A series of maximum voltages $V_{1\,max}^c(\lambda)$ at different wavelengths may be obtained by using a tunable laser as the light source. Similarly, the polarization controller 740 may be adjusted so that $V_2$, $V_3$, and $V_4$ each reach their respective maximum values $V_{2\,max}^c(\lambda)$, $V_{2\,max}^c(\lambda)$, and $V_{4\,max}^c(\lambda)$ at different wavelengths. All these values are recorded.

Next, the total input power at the calibration wavelengths, $P_{in}^c(\lambda)$, to the device 600 is measured for computing the following power ratios:

$$\gamma_i(\lambda) = \frac{V_{i\max}^c(\lambda)}{P_{in}^c(\lambda)} \quad (4)$$

Finally, for an arbitrary SOP and input power, the optical power received in each channel at a given wavelength may be calculated as:

$$P_i = \frac{P^c_{i\max}(\lambda)}{V^c_{i\max}(\lambda)} V_i \quad (5)$$

Therefore, for a given wavelength, the optical power in each channel can be calculated using the measured output voltage from the channel. When these powers are known, the SOP and DOP of the light may be conclusively computed using Eq. (1) and Eq. (2).

The reference polarization instrument 710 may now be used to verify the performance of the device 600. Such a calibration against the reference instrument should be performed before the measurement because the output fiber of the device 600 may have some residual birefringence which can cause the SOP to change. The calibration procedure described below is to align the polarization coordinate system of the device 600 with that of the reference instrument 710.

First, the polarization controller 740 is adjusted so that the SOP measured with the reference instrument 710 is linear at the 0 degree orientation and thus $$\vec{S}_a = (1,1,0,0). \quad (6)$$

Second, measured $V_1$, $V_2$, $V_3$, and $V_4$ values of the device 600 are used to compute a set of Stokes parameters using Eq. (1) to obtain $$\vec{S}'_a = (a_1, a_2, a_3, a_4). \quad (7)$$

Third, the two sets of Stokes parameters are related with a 4×4 transformation matrix M:

$$\vec{S}'_a = M \cdot \vec{S}_a, \quad (8)$$

where $$M = \begin{bmatrix} m11 & m12 & m13 & m14 \\ m21 & m22 & m23 & m24 \\ m31 & m32 & m33 & m34 \\ m41 & m42 & m43 & m44 \end{bmatrix}. \quad (9)$$

Four linear equations are derived from Eq. (8).

In step four, the polarization controller 740 is adjusted again such that the SOP measured with the reference instrument 710 is linear at the 90°-orientation:

$$\vec{S}_b = (1,-1,0,0) \quad (10)$$

Steps 2 to 3 are repeated here to obtain a second set of four linear equations based on Eq. (8).

In Step 5: the polarization controller 740 is adjusted such that the SOP measured with the reference instrument 710 is linear at the −45°-orientation:

$$\vec{S}_c = (1,0,-1,0) \quad (11)$$

Steps 2 to 3 are next repeated to obtain a third set of 4 linear equations.

In Step 6, the polarization controller 740 is adjusted such that the SOP measured with the reference instrument 710 is circularly polarized with a right hand rotation:

$$\vec{S}_d = (1,0,0,1) \quad (12)$$

Steps 2 to 3 are repeated to obtain a 4th set of 4 linear equations.

Finally, the above 16 linear equations are solved to obtain the all 16 matrix elements for the transformation matrix M in Eq. (9). With the transformation matrix M, the results from the polarimeter 600 may be compared with those from the reference polarization analyzing instrument 710 for any arbitrary SOP and DOP.

In the above designs, the reflector in each stage may be replaced by a reflective cube with a partial reflective 45-degree surface in the center of the cube. This design may be used to reduce undesired reflections and associated interferences caused by the reflections from two surfaces of each reflector plate.

The above described examples use four polarization optical elements to reflect four sample beams from four different locations along an optical path in free space. Such a free-space design has a number of advantages and avoid some inherent technical problems in some in-line polarimeters formed in fiber. For example, the free space nature of the specific examples for in-line polarimeters eliminate the user of fiber to guide the light and certain fiber-based devices such as fiber gratings and thus eliminates the fluctuations in fibers due to variations in temperature because fiber is known to change its optical properties with temperature. In addition, most fibers exhibit optical birefringence and polarization mode dispersion and thus can randomly modify polarization of light. Therefore, when fiber is used in a polarimeter, the fiber may change the polarization of input light and hence introduce errors in the polarization measurement. The free space propagation of light in the examples of in-line polarimeters described here does not alter the input polarization and thus can provide high accuracy in polarization measurements.

Furthermore, the in-line polarimeters described here may be implemented by using simple polarization-selective reflectors, such as four reflective cubes in different orientations, to sample the four beams for measuring the polarization. As illustrated in FIGS. 2 through 5B, the same reflective module having a polarization-selective reflector or cube may be used in any of the four sampling locations. In other implementations, an integrated device base may be used to receive four substantially identical partial reflective cubes at different orientations for sampling the input beam. Such designs can simplify the fabrication of the polarimeters and reduce the cost of manufacturing, maintenance, and repair of the polarimeters.

The exemplary in-line polarimeters illustrated in FIGS. 2 through 5B combine four separated polarization sampling modules to form the final polarimeter. Alternatively, a common platform or base may be used to replace the separate modules and to hold four partial reflective beam splitting cubes with corresponding notches or holes at pre-defined orientations for holding optical detectors that receive the sampled beams from the cubes. This alternative design can also simplify the polarimeter design and reduce the complexity and cost in fabrication.

Figure 8B:
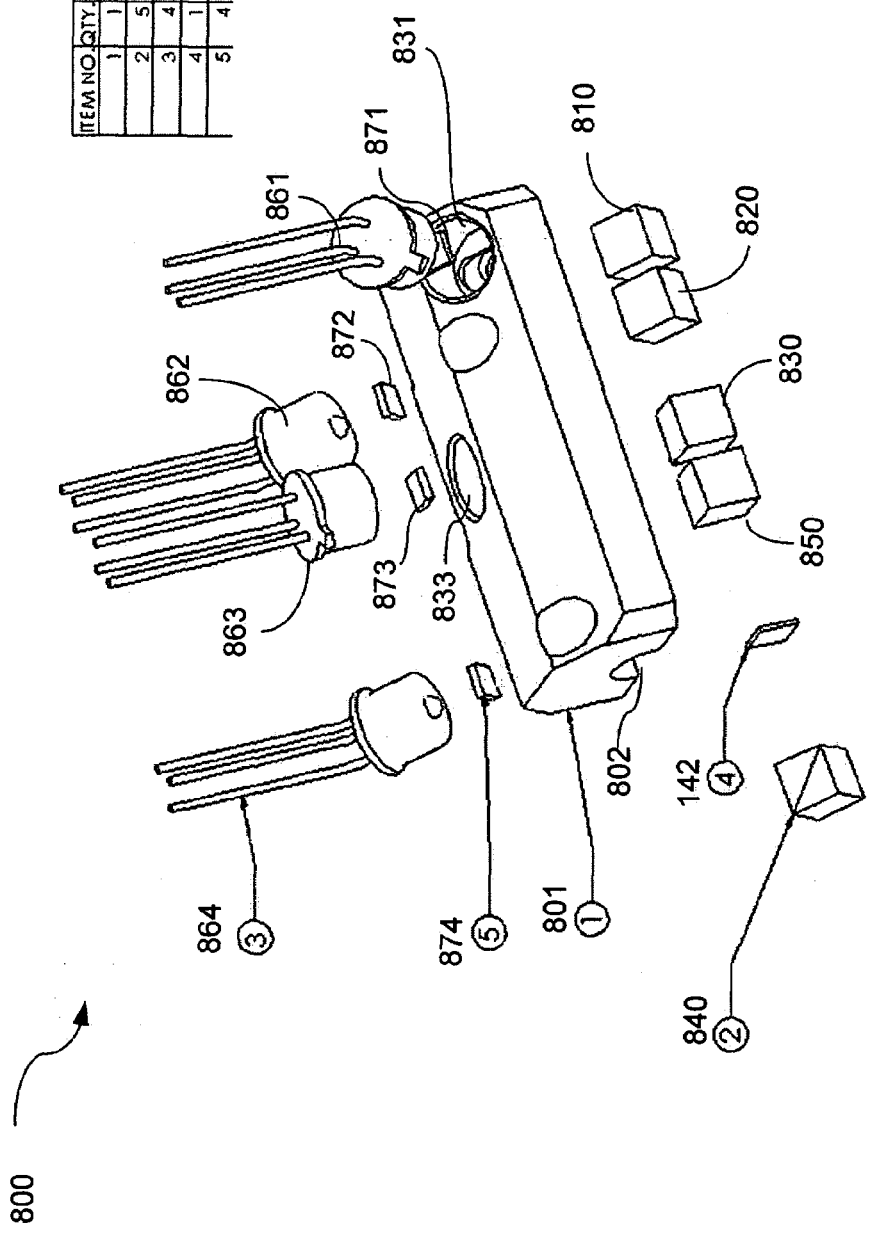
Figure 8D:
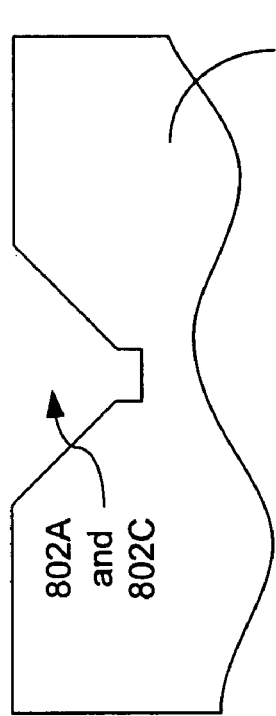
Figure 8E:
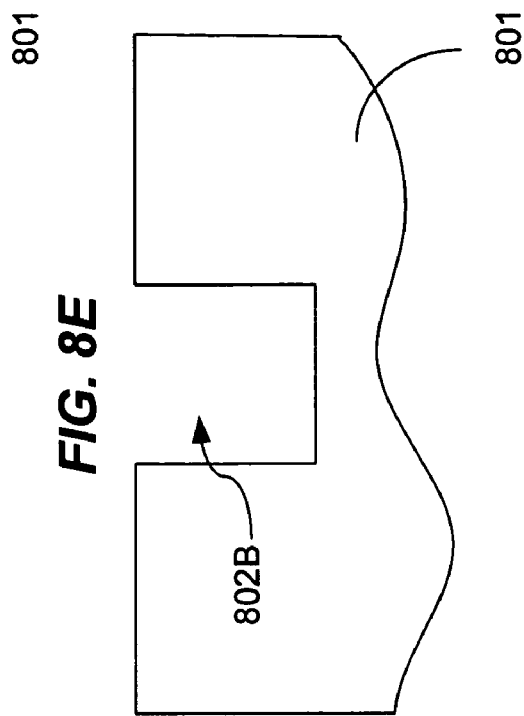
Figure 8C:
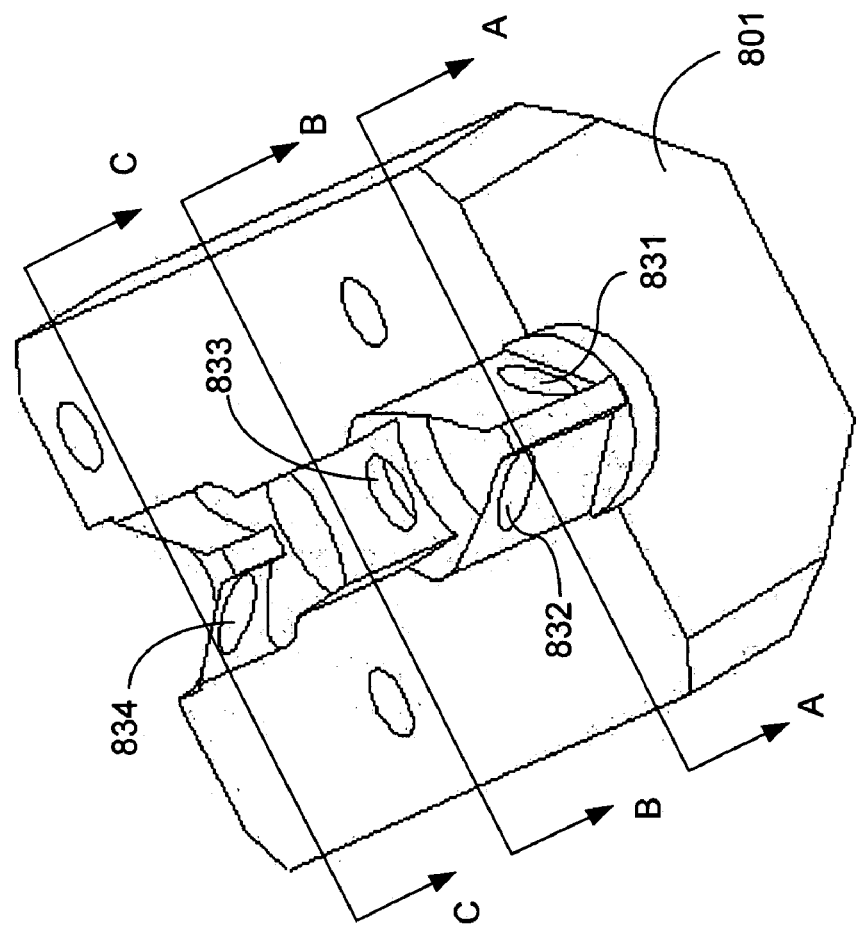

FIGS. 8A, 8B, and 8C illustrate one example of such an in-line polarimeter 800 formed on an integrated base 801 in different perspective views. The base 801 includes a groove 802 for placing four sampling beam splitting cubes 810, 820, 830, and 840 at different locations and orientations. The cross section of the groove 802 may be in various geometrical profiles, such as V-shaped, rectangular, or square. The cross section of the groove 802 may vary along the optical path. Referring to FIG. 8C, the groove 802 is V-shaped at locations for holding cubes 810 and 820, is rectangular or square at the location for holding the cube 830, and is V-shaped again at the location of the cube 840 for the particular orientations selected for the cubes in the illustrated example. FIG. 8D shows the cross section 802A and 802C of the groove 802 along the lines AA and CC, respectively. FIG. 8E shows the cross section 802B of the groove 802 along the line BB.

In the specific implementation as illustrated, the sampling beam splitting cubes 810, 820, 830, and 840 are oriented to correspond to the beam splitters 110, 120, 130, and 144 of the in-line polarimeter 100 in FIG. 1, respectively. Thus, the cube 810 is oriented to split a first sample beam with a linear polarization at 0 degree, the cube 820 is oriented to split a second sample beam with a linear polarization at 90 degrees, the cube 830 is oriented to split a third sample beam with a linear polarization at 45 degrees, and the cube 840 is oriented to split a fourth sample beam with a linear polarization parallel to the polarization of the sample beam generated by either one of the cubes 810. A quarter-wave plate 142 is placed between the cubes 830 and 840 so that the quarter-wave plate 142 and the cube 840 in combination form a circular polarization analyzer. The quarter-wave plate 142 may be oriented to have one principal axis at 45 degrees with respect to the polarization direction of the cube 830. The groove configuration 802 shown in FIGS. 8C, 8D and 8E is designed for the cube 840 to be oriented to be parallel to either one of the cubes 810. Alternatively, the cube 840 may be oriented to split the fourth sample beam with a linear polarization at −45 or 135 degrees and the quarter-wave plate 142 is aligned to have one of its principal axes to be parallel with the polarization direction of the cube 830.

The base 801 is designed to include four through holes 831, 832, 833 and 834 positioned and oriented to receive the first, second, third and fourth sample beams produced by the cubes 810, 820, 830 and 840, respectively. Each through hole is substantially perpendicular to the longitudinal direction of the groove 802 (i.e., perpendicular to the z direction). The dimension of each through hole is sized to receive and hold an optical detector. Four optical detectors 861, 862, 863, and 864 are respectively inserted into the holes 831, 832, 833 and 834, respectively, to convert the received sample beams into the four detector signals 161, 162, 163, and 164, respectively. Optionally, a linear polarizer (871, 872, 873, or 874) may be placed between each cube and the corresponding optical detector to ensure the proper linear polarization of the correspond sample beam at the optical detector since the actual orientation of each cube may be inaccurate and different from a desired linear polarization direction.

The above use of the common base 801 to support and hold four sampling cubes 810, 820, 830, and 840 and four corresponding optical detectors 861, 862, 863, and 864 simplifies the design of the components of the device 800 and the manufacturing process. For example, the optical alignment of the cubes and detectors is significantly simplified by using the common base 801 with predefined mechanical features such as the groove 802 and through holes 831-834. The cubes and detectors are approximately aligned by placing them at their respective positions on the base 801.

The above specific examples of polarimeters use three linear polarization analyzers and one circular polarization analyzer to provide four different or independent polarization measurements. The four different polarization measurements are then used to solve for the four Stokes vector components which provide the full information about the state of polarization of the light under measurement. The examples above place the three linear analyzers before the circular analyzer. In general, the sequence of the analyzers in the optical path can be arbitrary as long as four different polarization measurements are obtained to determine the SOP. Hence, the above three linear analyzers and the circular analyzer may be placed in other sequences along the optical path. As an example, the three optical linear polarization analyzers are oriented at three different states of linear polarization where any two of the three analyzers are at 90 or 45 degrees relative to each other. In addition, the specific orientations of the optical cubes and the quarter-wave plate are only examples of some convenient configurations with relative orientation angles at 90 or 45 degrees for ease of manufacturing the components and data processing. Other relative orientations for the four beam sampling elements may also be used. Any four in-line polarization analyzers capable of making four different polarization measurements from four sample beams are sufficient for determining of the SOP of input light.

Furthermore, the examples in FIGS. 1-7 use S polarization as an example of the linear polarization of each sample beam split by the corresponding polarization-selective cube. In general, the linear polarization of each sample beam may be P polarized or in another linear polarization direction. The specific polarization state of a sample beam is selected for convenience and is generally not limited to any particular state of polarization. It is sufficient that the four polarization analyzers sample four sample beams with four independent polarization states.

Since each of the four independent polarization analyzers is a polarization element, each analyzer may introduce polarization-dependent loss (PDL). Such PDL can adversely affect the accuracy of the SOP measurements of the subsequent in-line analyzers in the polarimeter and thus is undesirable. A compensation mechanism may be implemented to reduce or offset the PDL by each in-line analyzer.

Referring back to FIG. 8A, the cubes 810 and 820 are oriented to select first and second sample beams with orthogonal linear polarizations: the sample beam by the cube 810 is polarized at 0 degree and the sample beam by the cube 820 is polarized at 90 degrees. When two identical or similar polarization-selective cubes are used as the cubes 810 and 820, the two cubes are oriented to be orthogonal to each other in their polarization directions. Accordingly, the PDL introduced by the cube 810 is substantially canceled by the similar PDL introduced by the cube 820 in the orthogonal direction. Therefore, this arrangement of cubes 810 and 820 has a built-in compensation mechanism for reducing the PDL. The cube 830, the quarter-wave plate 142, and the cube 840 in the remaining part of the optical train in the in-line polarimeter, however, do not automatically reduce or offset the PDL produced by each element. For example, even if the remaining two cubes 830 and 840 are oriented to be perpendicular to each other in their polarization directions, the presence of the quarter-wave plate 142 between the cubes 830 and 840 optically separates the cubes 830 and 840 and generally prevents the PDL introduced by the cube 830 to be offset or compensated by the PDL introduced by the cube 840.

A PDL-compensating cube 850, however, may be introduced between the quarter-wave plate 142 and the cube 830 in the optical path of the in-line polarimeter to offset or compensate for the PDL introduced by the cube 830. This feature is shown in FIGS. 8A and 8B. The cube 850 may be a polarization-selective cube that is substantially identical or similar to the cube 830. The cube 850 is oriented to be perpendicular to the cube 830 in their polarization directions. Hence, the adjacent cubes 830 and 850 form an orthogonal pair just like the orthogonal pair formed by adjacent cubes 810 and 820. As a result, the PDL introduced by the cube 830 is offset by the PDL introduced by the cube 850. Alternatively, the cube 850 may be placed between the cubes 830 and 820 with its polarization direction perpendicular to the polarization direction of the cube 830. In either of two positions for the cube 850, the cube 850 may be used for the PDL compensation only and no optical detector is implemented at the cube 850 to receive light split off by the cube 850. In addition, a second PDL-compensating cube may be placed in the optical path adjacent to the sampling cube 840, before or after the cube 840.

Although the present disclosure only includes a few embodiments, it is understood that various modifications and enhancements may be made.

What is claimed is:

1. A device, comprising:
a base comprising a groove and four through holes located at four different sampling positions along the groove;
three optical linear polarization analyzers mounted in three of the four different sampling positions in the groove to define an optical path in free space to split three sample beams with three different states of linear polarization from an input optical beam propagating along the optical path, each optical linear polarization analyzer transmitting a majority of the input optical beam along the optical path and splitting a fraction of the input beam in a predetermined linear polarization as a respective sample beam into a respective through hole in the base;
a quarter-wave plate mounted in the groove before a fourth sampling position along the groove that is not occupied by any of the three optical linear polarization analyzers;
a fourth optical linear polarization analyzer mounted in the groove at the fourth sampling position to receive light transmitted through the quarter-wave plate along the optical path and to split a fraction of the received light in a fourth linear polarization to produce a fourth sample beam into a fourth through hole in the base, wherein the fourth optical linear polarization analyzer and the quarter-wave plate form a circular polarization analyzer; and
four optical detectors respectively positioned in the four through holes in the base to receive the four sample beams, respectively, and to convert the four sample beams into four detector signals indicative of optical power levels of the four sample beams, respectively.

2. The device as in claim 1, wherein the three optical linear polarization analyzers are arranged adjacent to one another in the optical path.

3. The device as in claim 1, wherein the three optical linear polarization analyzers are oriented at three different states of linear polarization where any two are at 90 or 45 degrees relative to each other.

4. The device as in claim 1, wherein the three optical linear polarization analyzers and the fourth optical linear polarization analyzer are polarization-selective beam splitting cubes.

5. The device as in claim 1, further comprising a processing unit to receive and process the four detector signals to determine the input polarization state of the input optical beam.

6. The device as in claim 1, wherein the three optical linear polarization analyzers are first, second, and third polarization-selective beam splitting cubes, respectively, and the fourth optical linear polarization analyzer is a fourth polarization-selective beam splitting cube,
wherein the first and second polarization-selective beam splitting cubes are placed adjacent to each other and are oriented to be orthogonal to each other in polarization, and
wherein the third polarization-selective beam splitting cube is oriented at 45 degrees in polarization relative to either one of the first and second and third polarization-selective beam splitting cubes.

7. The device as in claim 6, further comprising a fifth polarization-selective beam splitting cube mounted in the groove, positioned adjacent to the fourth polarization-selective beam splitting cube and downstream from the quarter-wave plate in the optical path, wherein the fifth polarization-selective beam splitting cube is oriented to be orthogonal in polarization to the fourth polarization-selective beam splitting cube to compensate for a polarization-dependent loss caused by the fourth polarization-selective beam splitting cube.

8. The device as in claim 6, further comprising a fifth polarization-selective beam splitting cube positioned adjacent to the third polarization-selective beam splitting cube and mounted in the groove, wherein the fifth polarization-selective beam splitting cube is oriented to be orthogonal in polarization to the third polarization-selective beam splitting cube to compensate for a polarization-dependent loss caused by the third polarization-selective beam splitting cube.

9. The device as in claim 8, further comprising a sixth polarization-selective beam splitting cube mounted in the groove, positioned adjacent to the fourth polarization-selective beam splitting cube and downstream from the quarter-wave plate in the optical path, wherein the sixth polarization-selective beam splitting cube is oriented to be orthogonal in polarization to the fourth polarization-selective beam splitting cube to compensate for a polarization-dependent loss caused by the fourth polarization-selective beam splitting cube.

10. A method, comprising:
directing an input optical beam through an optical path in free space to split four sample beams from said input optical beam for measuring an input polarization of the input optical beam and to transmit a majority of the input optical beam as an output beam;
placing two linear polarization analyzers adjacent to each other in the optical path with orthogonal polarization directions to obtain first and second sample beams of the four sample beams by reflecting fractions of the input beam;
placing a third linear polarization analyzer in the optical path with a third polarization direction different from polarization directions of the first and second linear polarization analyzers to obtain a third sample beam of the four sample beams;
placing a quarter-wave plate and a downstream fourth linear polarization analyzer in combination as a circular polarization analyzer in the optical path to obtain a fourth monitor beam of the four sample beams;
placing one linear polarization analyzer adjacent to and orthogonal in polarization to at least one of the third and fourth linear polarization analyzers to reduce a polarization-dependent loss caused by the at least one of the third and fourth linear polarization analyzers; and using four separate optical detectors to convert the four sample beams into four detector signals, respectively;

processing the four detector signals to determine the input polarization state of the input optical beam; and using a polarization-selective beam splitting cube as each of the linear polarization analyzer.

11. The method as in claim 10, further comprising using the four detector signals to solve for Stokes vector components in determining the input polarization state of the input optical beam.

* * * * *